(12) United States Patent
Kolackovsky et al.

(10) Patent No.: US 12,490,149 B2
(45) Date of Patent: Dec. 2, 2025

(54) MULTI-MODE SCANNING SYSTEM USING ROBUST COMMUNICATIONS PATH

(71) Applicant: Booz Allen Hamilton Inc., McLean, VA (US)

(72) Inventors: Alan Leon Kolackovsky, McLean, VA (US); John Robert Jackson, McLean, VA (US); Sam Atticus Wisotzki, McLean, VA (US); Fei Yang Soong, McLean, VA (US); Bryant Ngoc Huy Pham, McLean, VA (US); Joel William Davidson, McLean, VA (US); Travis Richard Ortiz, McLean, VA (US); Nathan Benjamin Mars, McLean, VA (US)

(73) Assignee: Booz Allen Hamilton Inc., McLean, VA (US)

( * ) Notice: Subject to any disclaimer, the term of this patent is extended or adjusted under 35 U.S.C. 154(b) by 636 days.

(21) Appl. No.: 17/712,609

(22) Filed: Apr. 4, 2022

(65) Prior Publication Data

US 2022/0322142 A1    Oct. 6, 2022

Related U.S. Application Data

(60) Provisional application No. 63/171,003, filed on Apr. 5, 2021.

(51) Int. Cl.
*H04W 28/18* (2009.01)
*H04L 43/028* (2022.01)

(52) U.S. Cl.
CPC .......... *H04W 28/18* (2013.01); *H04L 43/028* (2013.01)

(58) Field of Classification Search
None
See application file for complete search history.

(56) References Cited

U.S. PATENT DOCUMENTS

| 11,067,718 | B1* | 7/2021 | Brett | H04W 4/38 |
|---|---|---|---|---|
| 2012/0240196 | A1 | 9/2012 | Bhagwat et al. | |
| 2018/0191829 | A1* | 7/2018 | Morales | H04W 4/70 |
| 2019/0095925 | A1 | 3/2019 | Gabriele et al. | |
| 2019/0349760 | A1* | 11/2019 | Fong | H04L 27/0006 |
| 2020/0118405 | A1 | 4/2020 | Benson et al. | |
| 2020/0145493 | A1* | 5/2020 | Wang | H04L 67/56 |
| 2020/0322216 | A1 | 10/2020 | Singla et al. | |
| 2020/0358184 | A1 | 11/2020 | Tran et al. | |
| 2021/0090430 | A1 | 3/2021 | Komoni et al. | |
| 2022/0028249 | A1* | 1/2022 | Saldin | G06F 3/14 |

* cited by examiner

*Primary Examiner* — Ayman A Abaza
*Assistant Examiner* — Hooman Houshmand
(74) *Attorney, Agent, or Firm* — Volpe Koenig

(57) ABSTRACT

A technique for performing sensing operations is provided. The technique includes controlling a plurality of sensors to obtain sensed data, according to one or more commands received from a remote device over a robust communications channel that includes a plurality of communications paths; and returning the sensed data over the robust communications channel to the remote device.

20 Claims, 5 Drawing Sheets

MULTI-MODE SCANNING SYSTEM USING ROBUST COMMUNICATIONS PATH

CROSS-REFERENCE TO RELATED APPLICATIONS

This application claims priority to U.S. Provisional Patent Application No. 63/171,003, entitled "SCANNING SYSTEM," filed on Apr. 5, 2021, the entirety of which is hereby incorporated herein by reference.

BACKGROUND

It is sometimes desired to detect and monitor electronic communications in a robust manner. Technology for performing such activity is constantly being developed.

BRIEF DESCRIPTION OF THE DRAWINGS

A more detailed understanding can be had from the following description, given by way of example in conjunction with the accompanying drawings wherein.

DETAILED DESCRIPTION

Disclosed herein is a sensor device that is capable of sensing a wide variety of features of the environment such as electronic communications, physical aspects of the environment, or other aspects of the environment. The sensor device is controllable via a remote device via a robust communication channel. The remote device provides an interface to a human user for controlling operation of the sensor device. The remote device is capable of providing commands to the sensor device that dictate what to scan for. The remote device is also capable receiving data representative of the scanned items from the sensor device via the robust communication channel and presenting that data to a user. Together, the sensor device and remote device allow a remote user to observe a large number of features in the location of the sensor device, such as what types of communications are occurring in that location, what information is being transmitted over those communications, what devices are performing such communications, as well as to observe other aspects of the location, such as ambient physical, electromagnetic, geographic, or other characteristics. The robust communication channel between the sensor device and the remote device allows a degree of resilience to disruption to wireless communication between the sensor device and the remote device.

Figure 1:
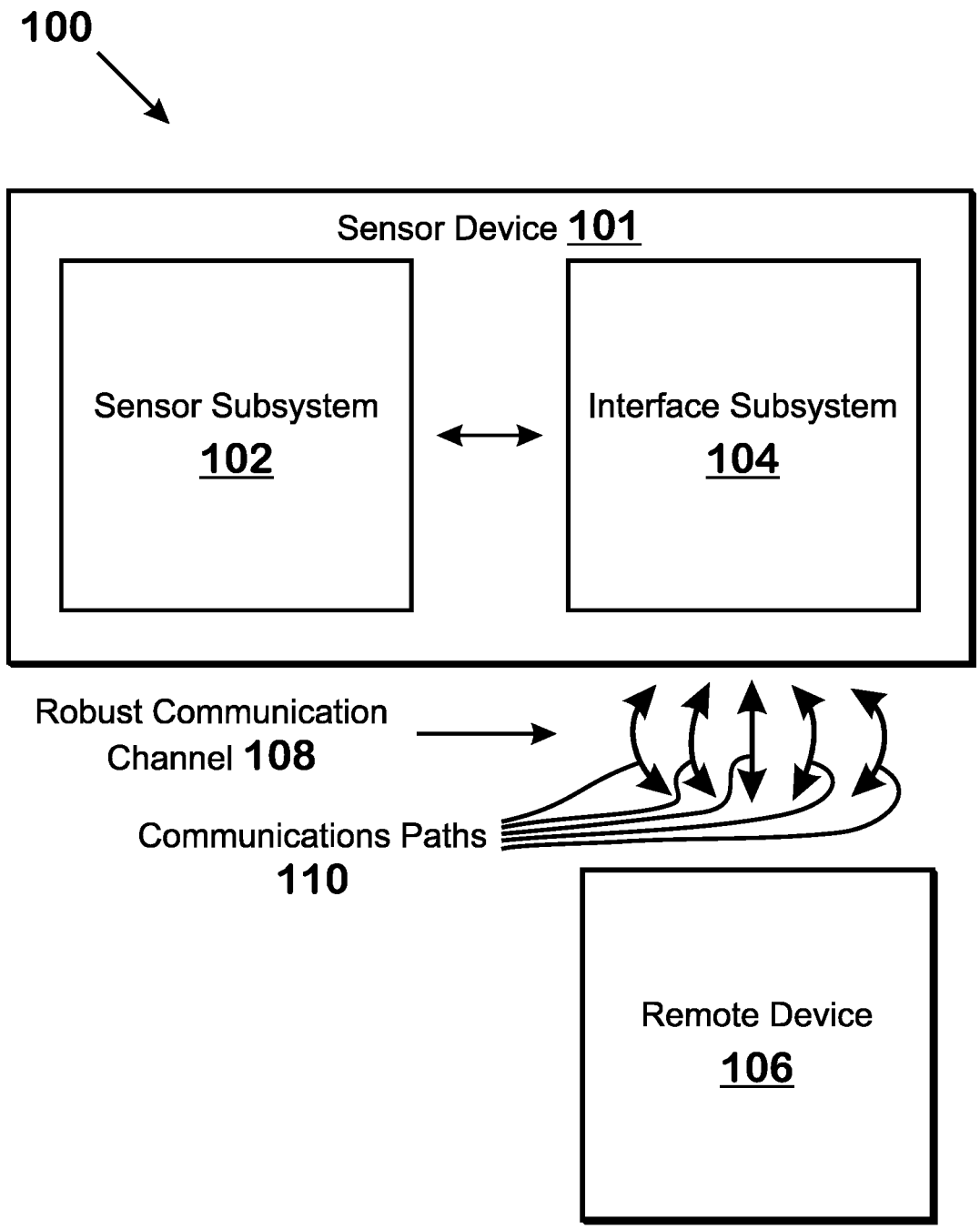
FIG. 1 illustrates a scanning system, according to an example.

FIG. 1 illustrates a scanning system 100, according to an example. The scanning system 100 includes a sensor device 101 and a remote device 106. The sensor device 101 scans for electronic communications of various formats and/or at various frequency ranges. The sensor device 101 also scans or detects other ("physical") aspects of the environment, such as electrical, optical, magnetic, physical, location, time, or other aspects. The sensor device 101 includes a sensor subsystem 102 and an interface subsystem 104. The sensor subsystem 102 includes a plurality of sensors for detecting electronic communications and other aspects of the environment. The interface subsystem 104 includes components for communicating with the remote device 106, including receiving commands and transmitting sensed data. The interface system 104 also includes components for controlling the sensor subsystem 102 according to commands received from remote device 106. The interface subsystem 104 acts as a translation and communication layer, facilitating communication between the sensor subsystem 102 and the remote device 106.

The sensor subsystem 102 is capable of scanning for multiple different types of communications and of detecting other aspects of the environment. For example, the sensor subsystem 102 is capable of detecting signals of a variety of different wireless communication protocols (e.g., Wi-Fi, Bluetooth, cellular communication) and is capable of using software radio to scan for signals specified programmatically. Although some communication protocols are listed herein, this should not be taken as an exhaustive list—the sensor subsystem 102 can be adapted to scan for any technically feasible communications protocol. The sensor subsystem 102 is also capable of performing more in-depth detection and analysis of signals sent with specific wireless communication protocols.

In some examples, the sensor subsystem 102 includes one or more protocol-specific hardware transceivers, each of which is capable of detecting and reading signals of one or more particular wireless communication protocols, and analyzing those signals. Such transceivers (along with other elements described elsewhere herein) are sometimes referred to as "sensors" herein. Herein, the term "scanning mode" refers to the sensor subsystem 102 performing a scanning operation for a particular communication protocol, performing a scanning operation using a software radio, or performing another type of sensing or scanning operation, such as scanning physical characteristics of the environment (e.g., optical features, magnetic features, electrical features, physical features, location, time, or other aspects).

The interface subsystem 104 is communicatively coupled to the sensor system 102 and is capable of communicating with the remote device 106 via the robust communication channel 108. The interface system 104 receives commands from the remote device 106 via the robust communication channel 108. The commands request that the sensor subsystem 102 begin or stop scanning according to one or more scanning modes. In response to receiving such commands, the interface subsystem 104 controls the sensor subsystem 102 to begin or end scanning for the one or more scanning modes, according to the commands. The sensor subsystem 102 performs these actions as specified by the interface system 104.

The sensor subsystem 102 performs the requested scanning, generates reporting data about the requested scanning, and transmits the reporting data to the interface system 104. The interface system 104 transmits the data to the remote commanding system 106 via a robust communication channel 108. In some examples, the reporting data includes raw data sensed using one or more of the commanded scanning modes. For example, for a scanning mode including scanning for communications sent via one or more communications protocols, the reporting data includes raw data indicative of the analog electromagnetic signals sensed on that protocol. In scanning mode examples that include scanning physical characteristics of the environment, the raw data includes raw measurements taken about environmental factors. In some examples, reporting data includes processed raw data for communications sent via one or more communications protocols. In such examples, the processed raw data includes payload information decoded from the electromagnetic signals received according to the communications protocols. More specifically, such raw data would include digital information encoded into the communication protocol.

In some examples, reporting data includes processed encoded data that provides analytical information about the data sensed via a particular communication protocol. In some examples, the analytical information identifies one or more characteristics of the data transmitted according to the communication protocol. In some examples, the characteristics include frequency, frequency shift amplitude, modulation, and receive signal strength. In examples, such information allows for a determination of the identity (e.g., type) of the device transmitting or receiving the communications. In some examples, the characteristics include device identifier ("ID") and network ID, which allow detection, classification, and identification of specific transmitters. In some examples, the characteristics allow for detection and classification of repetitively observed signals based on the known properties of specific hardware types as well as comparison of repetitively seen signals.

In scanning mode examples that include scanning physical characteristics of the environment, the reporting data includes processed raw data received with scanning modes that scan physical characteristics of the environment. In such examples, the processed raw data includes processed measurements obtained in such scanning modes. These processed measurements include geographic location, time of day, and weather conditions including temperature, humidity, and barometric pressure.

As described elsewhere herein, the sensor device 101 communicates with the remote device 106 via the robust communication channel 108. Communications occurring across the robust communication channel 108 include commands from the remote device 106 to the sensor device 101 indicating how to scan, as well as data reflecting what has been scanned from the sensor device 101 transmitted to the remote device 106. The robust communications channel 108 includes multiple individual communication paths 110 between the sensor device 101 and the remote device 106. Each communication path 110 is embodied as any of a variety of communications techniques or mechanisms. Some examples include a wireless compute network (e.g., "Wi-Fi"), a cellular phone network, a Bluetooth network, other communications protocols, as well as radio communication channels. Each communications path 110 implemented as a radio communication channel can be defined based on a carrier wave frequency or band of frequencies over which communication occur. In some implementations, at least one communication path 110 is a wired communication path. In some implementations, the communications paths 110 include a combination of wired and wireless communications channels. In other implementations, the communications paths 110 are all wireless.

The robust communication channel 108 is robust in that there are multiple communications paths 110 over which communication can occur, which provides redundancy and resilience against communication disruption. More specifically, at any particular point in time, it is possible for one or more of the communications paths 110 of the robust communications channel 108 to be disrupted in some manner, for example, as a result of unrelated communications occurring on similar frequencies. Disrupted communications paths 110 may have insufficient bandwidth to carry all of the reporting data from the sensor device 101 to the remote device 106. In addition, it is possible for the amount of data needed to be transmitted over the robust communications channel 108 to be greater than the available bandwidth over any given communications path 110.

For these reasons, the sensor device 101 and remote device 106 are capable of changing which communications paths 110 are used to transmit data and commands between the sensor device 101 and the remote device 106. Any combination of communications paths 110 may be selected for transmission of the data and commands. In some examples, one or more communications paths 110 are selected to transmit data or commands manually. In other examples, one or more communications paths 110 are selected to transmit data or commands automatically.

Regarding selecting the one or more communications paths 110 manually, the remote device 106 is capable of presenting options to a user regarding which communication paths 110 to use for transmitting commands and/or receiving data to/from the sensor device 101. A user is able to select one or more communication paths 110 for such purposes. The remote device 106 transmits such selection(s) to the sensor device 101 and/or operates according to the selection(s). A user is able to at any time or at permitted times change the selection of which communication path(s) to use for transmitting commands or data.

In some examples, the sensor device 101 or remote device 106 automatically selects one or more communication paths 110 for transmission of commands and/or data. In some examples, the sensor device 101 and/or remote device 106 monitors conditions for the communication paths 110 and selects communications paths deemed to be most desirable or optimal for transmission. In some examples, the sensor device 101 and/or remote device 106 selects one or more communication paths 110 exhibiting the most bandwidth, the least interference, or exhibiting some other characteristic or combination of characteristics deemed to be optimal or most desirable. The sensor device 101 and/or remote device 106 then communicates according to that selection. In some examples, the remote device 106 or sensor device 101 is transmitting according to a set of one or more communication paths 110 and detects a reduction in signal quality (e.g., bandwidth) across one or more of these communication paths 110. In response to this detection, the remote device 106 or sensor device 101 identifies one or more other communication paths 110 on which to transmit commands or data and transmits commands or data on those one or more communication paths 110 instead of the set of one or more communication paths 110 previously transmitted on.

In some examples, the sensor device 101 and/or remote device 106 use both automatic and manual techniques for selecting communication paths 110 for transmission of commands and data. In an example, when the remote device 106 receives a selection made by a user to use one or more communication paths 110 for transmitting commands or data, the remote device 106 and sensor device 101 transmit commands and data according to that selection. In addition, the sensor device 101 and/or remote device at various times automatically selects one or more communication paths 110 for transmission and transmits according to such selection. In some examples, either manual or automatic selection has priority such that selection of communication paths 110 according to the mode (manual or automatic) with priority takes precedence over selection of communication paths 110 without priority.

It is possible for the communication paths 110 used for transmission of data (e.g., reporting raw, processed, or other data sensed with the sensors) to be different than the communication paths 110 used for transmission of commands (e.g., indicating what to scan). In such instances, manual or automatic selection may be used to select one or more communication paths 110 for transmission of data or one or more communication paths 110 for transmission of commands.

The remote device 106 includes components such as processors, memory, and communications devices, for communicating with the sensor device 101 as described herein. In some examples, the remote device 106 includes components (e.g., hardware and software) that provide a user interface for presenting data derived from the sensors of the sensor device 101. In some examples, the user interface also allows a user to control operation of the sensor device 101 and/or the remote device 106. In various examples, the user interface allows a user to select what to scan, to select what communication paths 110 to use, to select how to scan, or to perform other actions. In some examples, the user interface is a software user interface made available with input and output devices such as a screen, keyboard, and mouse. In some examples, the user interface includes at least some dedicated hardware components such as hardware buttons or other input means providing access to specified functionality (such as changing what is scanned, what information is presented, or other such information). In some examples, the remote device 106 is a commodity computing device such as a laptop, desktop, phone, table, or other computing device. In such examples, the remote device 106 includes custom software for communicating with and controlling the sensor device 101 as described herein. In other examples, the remote device 106 is a customized hardware device specialize for communicating with the sensor device 101. In such examples, customized hardware and/or software of such a device communicates with and controls the sensor device 101.

It is possible for the functionality of the sensor device 101 to be accessed by multiple different remote devices 106. Each remote device may be a similar or different computing device such as one of the types of devices described herein. In such a system, each remote device 106 is able to control and/or receive data from the sensor device 101.

Figure 2:
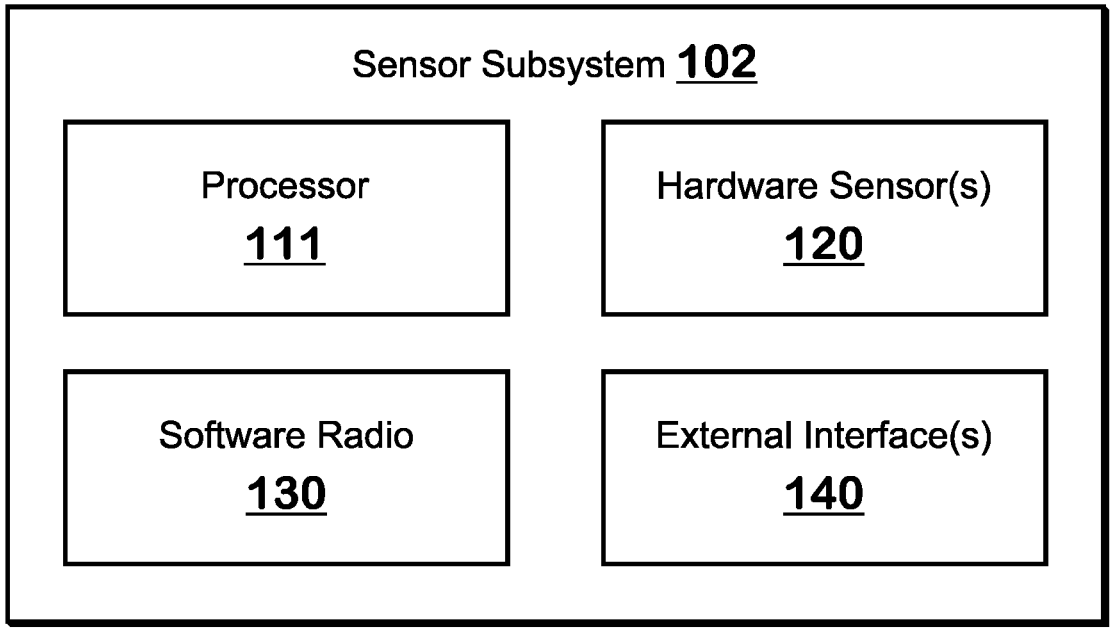
FIG. 2 is a block diagram illustrating details of the sensor subsystem and the interface subsystem, according to an example.
Figure 2:
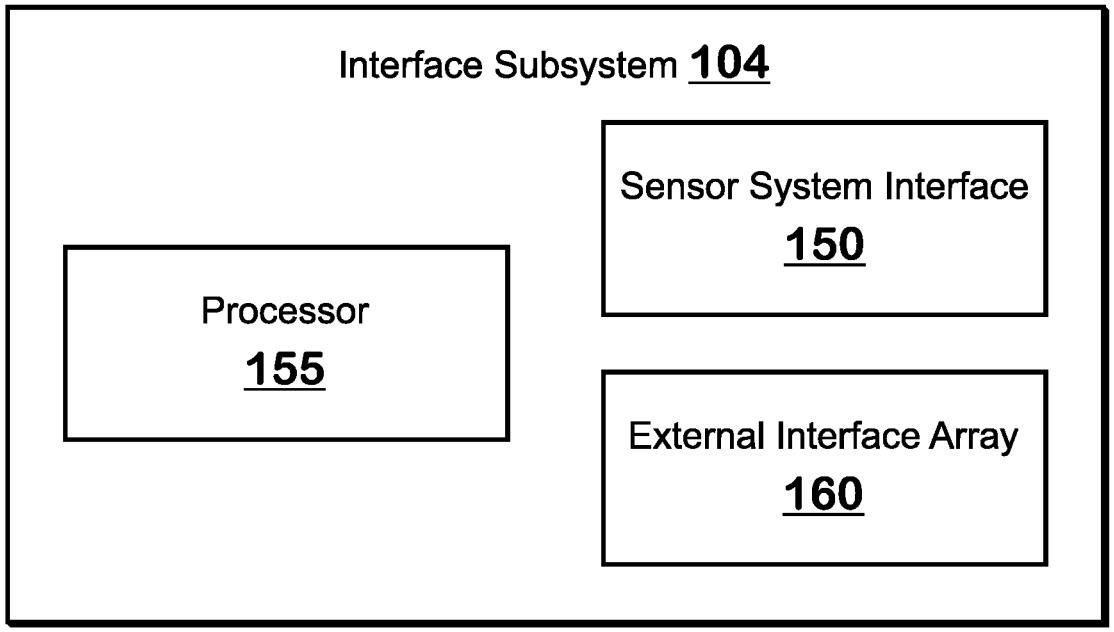

FIG. 2 is a block diagram illustrating details of the sensor subsystem 102 and the interface subsystem 104, according to an example. The sensor subsystem 102 includes a processor 111, one or more hardware sensors 120, a software radio 130, and one or more external interfaces 140.

The processor 111 controls and communicates with the other components of the sensor subsystem 102, including the software radio 130, the hardware sensor(s) 120, and the external interface(s) 140. For example, the processor 111 receives commands from the interface subsystem 104 via the external interface(s) 140 and commands the hardware sensor(s) 120 and/or the software radio 130 per those commands. Some such commands include instructions to scan for activity on various scanning modes.

The hardware sensor(s) 120 include one or more devices with at least some fixed function hardware configured to receive signals with a particular communication protocol, and/or to scan environmental factors and to interpret those signals and/or environmental factors to obtain detailed information about such communications. Some examples of the communication protocols include Bluetooth and WiFi protocols, as well as cellular phone protocols and other protocols. In some examples, the hardware sensor(s) 120 include one or more of an electro-optical sensor, an infrared sensor, a global positioning system, a magnetometer, an audio sensor, a position, navigation, and timing sensor, or other sensor(s), and these sensors scan the environmental factors. Features detected with these sensors are sometimes referred to as "physical features of the environment," "environmental features," "environmental aspects," or other features, and are in contrast with the communicative features of the environment (e.g., radio or communication protocols) described herein. In some examples, the hardware sensor(s) 120 include machine learning accelerated signal recognition hardware or software configured to recognize signal sources for signals received via the hardware sensor(s) 120. It should be understood that it is possible for one or more of the hardware sensor(s) 120 to be able to detect objects or other entities instead of only being able to detect signals. The processor 111 is capable of performing analysis on data received with the hardware sensor(s) 120 and/or software radio 130. The processor 111 is any processor—programmable or fixed-function—that controls the other components of the sensor subsystem 102. For example, the processor 111 is capable of instructing the hardware sensors 120 to begin scanning for signals, and/or to cause the software radio 130 to scan as programmed.

The software radio 130 includes an electromagnetic spectrum transceiver that is configurable via software executing in the processor 111 to scan for electromagnetic signals for a variety of frequencies specified by the processor 111. The software radio 130 scans the specified set of frequency ranges and provides information including detected signals for the scanned ranges to the processor 111. In some examples, the processor 111 derives a set of data including frequency and amplitude of the scanned signal over time from the information received from the software radio 130. In some examples, the processor 111 further characterizes the data, including identifying specific sources (e.g., communication protocols, device types, or the like) based on the derived set of data. In some examples, the processor 111 employs machine learning to analyze the derived set of data to identify the specific sources of the data and/or to perform other analysis for the scanned data.

The external interface 140 includes one or more hardware or software elements that allow the sensor subsystem 102 to communicate with the interface subsystem 104. The external interface 140 is embodied in any technically feasible manner, such as one or more internal busses, memory and/or cache systems, or other communication systems. The external interface(s) 140 is communicatively coupled to the sensor system interface 150 and thus allows transmission to the interface subsystem 104 of data sensed with the hardware sensor(s) 120 and software radio 130. The external interface(s) 140 also receive commands from the interface subsystem 104 ultimately provided by the remote device 106.

The interface subsystem 104 includes a processor 155, a sensor system interface 150, and an external interface array 160. The processor 155 controls the external interface array 160 to communicate the collected data over the robust communication channel 108 to the remote system(s) 106 as instructed by the remote system 106. The sensor system interface 150 includes one or more hardware or software elements that communicate with the external interface 140 of the sensor subsystem 102. In various examples, the sensor system interface 150 includes one or more communication busses, memory and/or cache, and/or any other communication mechanism. The external interface array 160 includes one or more communication elements capable of communicating with the remote device 106. Some examples include one or more wireless communications mechanisms (e.g., wi-fi, cellular, Bluetooth, radio, or other wireless communications) and/or one or more wired communications mechanisms (e.g., computer network or other network).

Although the sensor subsystem 102 and interface subsystem 104 are illustrated separately, in some implementations, the sensor subsystem 102 and interface subsystem 104 are partially or fully combined into a single entity. In some examples, the sensor subsystem 102 and interface subsystem 104 share a programmable processor (for example, the processor 111 and processor 155 are the same). In some examples, the sensor subsystem 102 and interface subsystem 104 share at least some communications mechanisms. In an example, at least some of the hardware sensors 120, are the same as at least some of the external interface array 160. In other words, in some implementations, the sensor device 101 scans for electronic communications with the same elements as the sensor device 101 transmits data to and receives commands from the remote device 106.

The interface subsystem 104 acts as a translation layer between the remote device 106 and the sensor subsystem 102. More specifically, the interface subsystem 104 receives the commands from the remote device 106 and translates those commands into the protocols used by the hardware sensor(s) 120. The interface subsystem 104 provides these translated commands to the sensor subsystem 102 for application to the hardware sensor(s) 120 and/or software radio 130. For example, while the commands are received in a common protocol, each hardware sensor 120 and software radio 130 has different interfaces for communication. Thus the interface subsystem 104 translates the commands of the common protocol to the different interfaces for each of the hardware sensors 120 and software radio 130.

Figure 3:
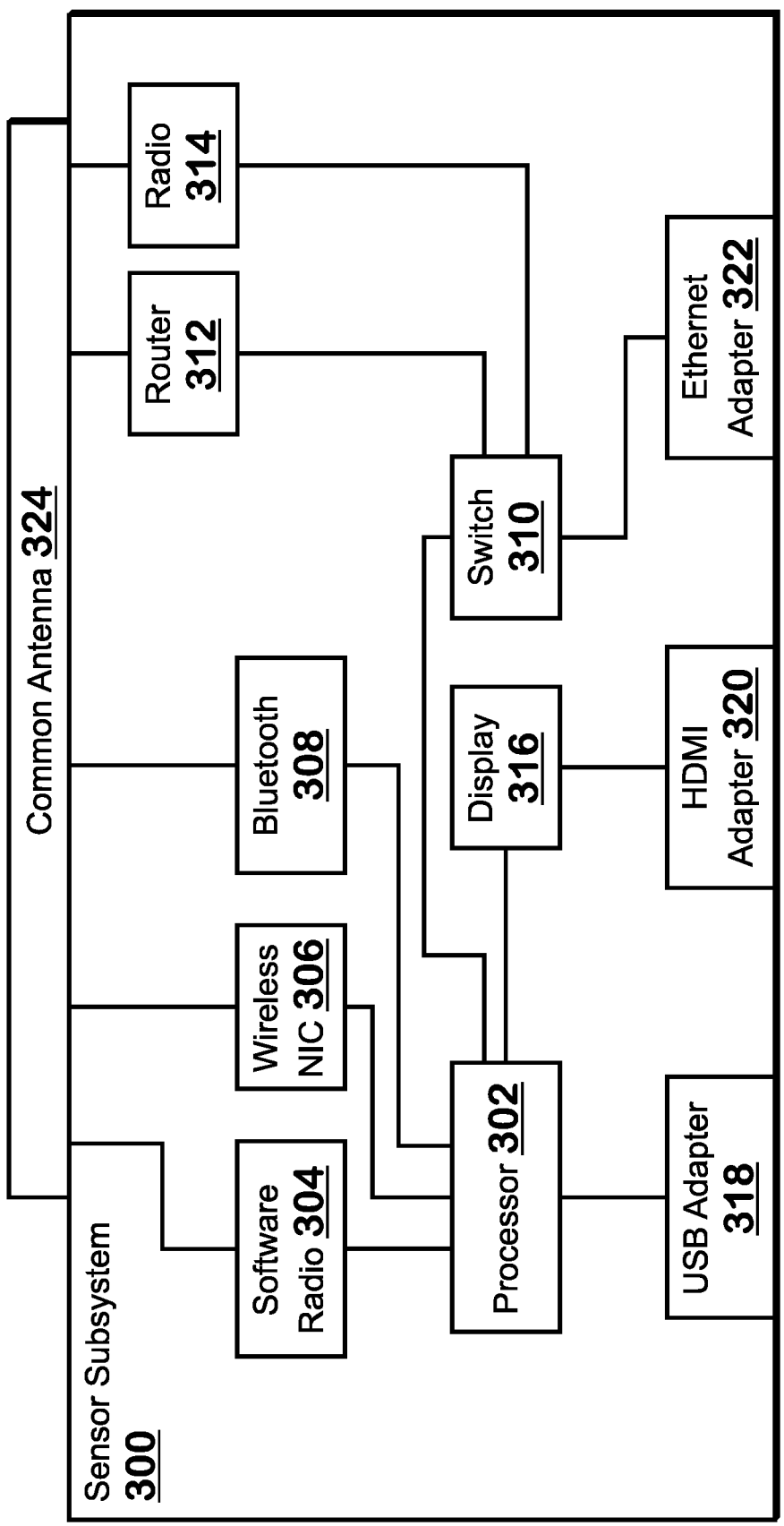
FIG. 3 is a block diagram of a sensor subsystem, according to an example.

FIG. 3 is a block diagram of a sensor subsystem 300, according to an example. The sensor subsystem 300 is an example implementation of the sensor subsystem 102 of FIG. 1. The sensor subsystem 300 includes a processor 302, a software radio 304, a wireless network interface controller ("NIC") 306, a Bluetooth adapter 308, a switch 310, a router 312, a radio 314, an ethernet adapter 322, a display adapter 316, a high-definition multimedia interface ("HDMI") adapter 320, and a universal serial bus ("USB") adapter 318.

The processor 302 is the processor 111 of FIG. 2. The processor 302 drives other elements of the system, such as the software radio 304, wireless NIC 306, Bluetooth adapter 308, router 312, radio 314, ethernet adapter 322, and USB adapter 318, as well as the HDMI adapter 320.

The software radio 304 is an example of the software radio 130 of FIG. 2. The wireless NIC 306 is an adapter that communicates via a wireless networking protocol. The Bluetooth adapter 308 is an adapter that communicates via the Bluetooth protocol. The router radio 314 is an adapter that transmits and receives wireless electromagnetic communications. The ethernet adapter 322 is a wired adapter that transmits and receives communications over a wired computer network. The USB adapter 318 receives and transmits communications via the USB protocol. The display adapter 316 drives a display via the HDMI adapter 320. The switch 310 mediates access by the processor 302 to the router 312 and the radio 314. The processor 302 drives each of the elements illustrated to scan electromagnetic communications in the vicinity of the sensor subsystem 300. The processor 302 also communicates with the interface subsystem 104 via one of the USB adapter 318 or ethernet adapter 322.

Figure 4:
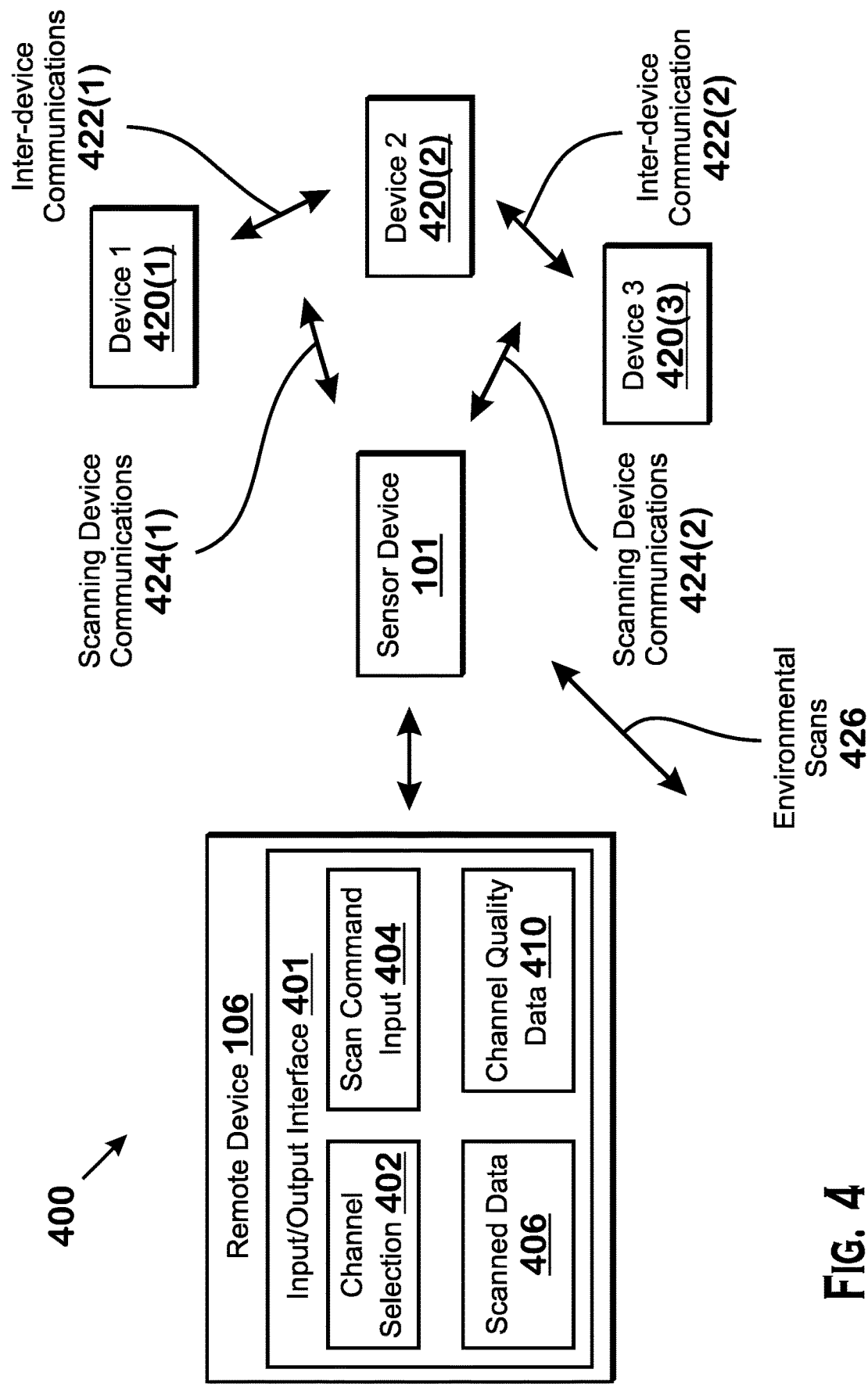
FIG. 4 is a block diagram illustrating example operation of the sensing system.

FIG. 4 is a block diagram illustrating example operation of the sensing system 100. FIG. 4 illustrates a remote device 106 and a sensor device 101. The sensor device 101 is operating in an environment with other devices 420 which are communicating with each other wirelessly using inter-device communications 422. The devices 420 are communicating with each other via any communications protocol, such as those described herein or other communications protocols. The remote device 106 commands the sensor device 101 to scan according to these communications protocols. There are also environmental aspects that the sensor device 101 is scanning using environmental scans 426, where these environmental aspects are not radio communications or communications occurring according to a communications protocol. In examples, these environmental aspects are optical aspects, infrared emissions, magnetic features, audio emissions, positional and/or navigational aspects, timing-related aspects, or other aspects.

The remote device 106 includes an input/output interface 401. In various examples, the input/output interface 401 includes one or more of a screen, keyboard, mouse, buttons, or other input and/or output devices. The input/output interface 401 presents a channel selection feature 402 and a scan command input feature 404, as well as scanned data 406 and channel quality 410. The channel selection feature 402 and the scan command input features 404 can be graphical features accepting input from a user, buttons accepting input from a user, or any other mechanism for accepting input from a user. The channel selection 402 allows for selection of one or more communication paths 110 to transmit commands and data between the sensor device 101 and the remote device 106. More specifically, the remote device 106 receives a selection of one or more communication paths 110 over which to transmit commands and data and transmits the commands and data via the selected one or more communication paths 110.

The scan command input 404 allows a user to command the sensor device 101. The scan command input 404 includes any of a variety of input mechanisms such as software or hardware mechanisms for capturing button presses, mouse clicks, touch inputs, or any other inputs. The remote device 106 accepts input via the scan command input feature 404, and sends commands to the sensor device 101 to perform scanning according to the commands from the user.

The remote device 106 also presents one or more of scanned data 406, and channel quality data 410 to the user. The scanned data 406 comprises the actual measurements or readings obtained by the scanning device 101, presented to the user via any of a variety of output mechanisms. In an example, the remote device 106 outputs the scanned data 406 to a screen or other type of display via audio mechanisms, and/or via haptic or other types of mechanisms.

The scanned data 406 includes data about communications and/or environmental features detected with the sensor device 101. In some examples, the scanned data 406 includes raw data (e.g., a waveform) transmitted over a scanned communication channel, "payload" data which is the digital information transmitted over the communications channel, or processed data, which is raw or payload data processed by the sensor device 101 and/or remote device 106 to provide additional information not readily apparent from the raw data. In some examples, the processing includes filtering of the data to obtain desired data (e.g., an identification of the device 420 sending the data, geographic location of the device 420, or other information). In other examples, the processing includes performing other operations to derive desired information from the obtained data.

In some examples, the remote device 106 and/or sensor device 101 hosts one or more machine learning models that processes the data received through scanning. In various examples, hardware, software, or a combination thereof, executes or otherwise enables operation of such machine learning models. Such a machine learning model is trained to recognize derived features of the scanned data. In some examples, such a machine learning model presents such derived features to the user via the processed data 406. In various examples, the derived features include an identification of what types of devices (e.g., laptop, phone, desktop, internet-of-things device, or other device) are involved in the communications.

The channel quality data 410 presents information about the communications paths 110 between the remote device 106 and the sensor device 101. The channel quality data 410 can be output as visual output (e.g., on a screen or other display), audio output, haptic output, and/or other types of output. In some examples, the channel quality data 410 includes information such as signal strength and/or available bandwidth. Such information, when presented to a user, could assist the user with selecting an appropriate communications path 110 for transmission of data and/or commands.

Overall, the input/output interface 401 of the remote device 106 allows a user to monitor the communication between the remote device 106 and the sensor device 101, to command the sensor device 101 regarding which protocols, frequencies, or environmental aspects to scan, to view the resulting data, and to select communication paths 110 for transmission of all of this information. The input/output interface 401 allows the user to view the data scanned via the sensor device 101 and processed via the sensor device 101 and/or remote device 106. The input/output interface 401 thus allows the user to continuously monitor the physical and electronic environment of the sensor device 101 and to continuously modify what is being scanned and how the sensor device 101 communicates with the remote device 106 in order for communication between the remote device 106 and the sensor device 101 to be robust.

Figure 5:
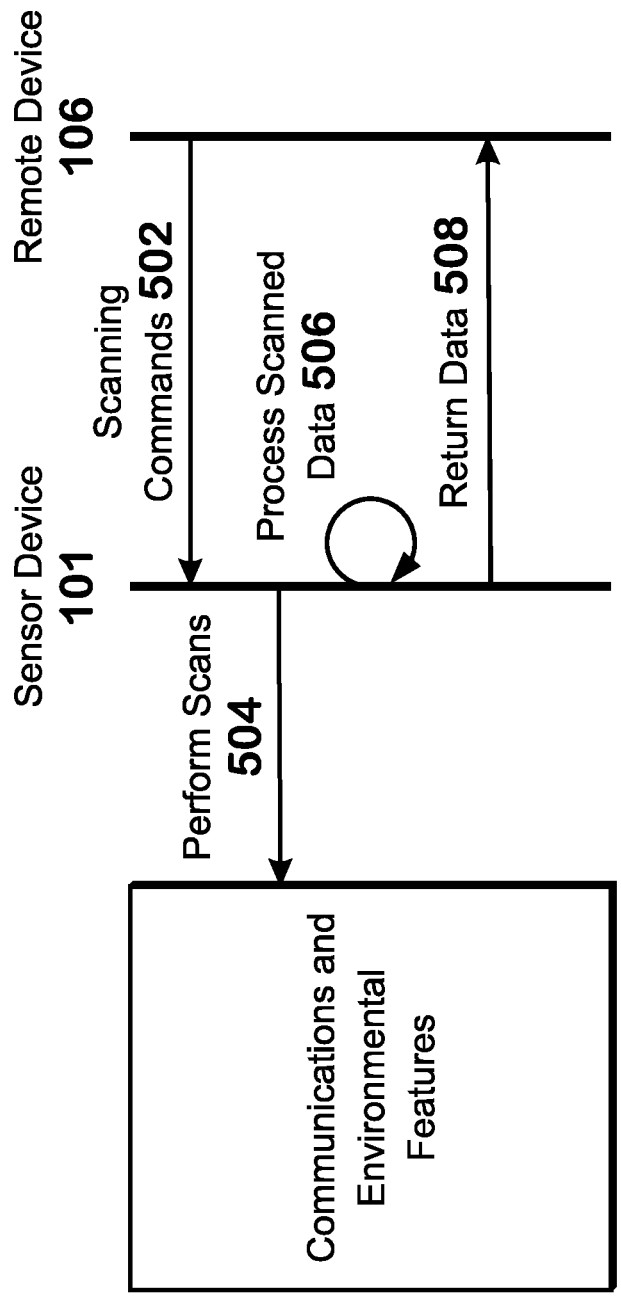
FIG. 5 is a diagram illustrating operations of the scanning system according to an example.

FIG. 5 is a diagram illustrating operations of the scanning system 100 according to an example. This diagram illustrates an example set of operations occurring for the sensor device 101 and remote device 106. While this example is described, it should be understood that but it should but understood that any of a variety of sequences of operations could be performed by the sensor device 101 and remote device 106, in line with the disclosure provided herein.

In operation 502, the remote device 106 sends scanning commands to the sensor device 101. The scanning commands indicate to the sensor device 101 what types of scanning the sensor device 101 is to perform. In various examples, the scanning commands include commands to scan according to one or more electronic communications protocols, and/or commands to scan one or more environmental features. In some examples, the sensor device 101 receives the scanning commands with an interface subsystem 104. The interface subsystem 104 includes elements that receive the commands and "translate" the commands for a sensor subsystem 102. The translation involves converting the commands as received from the remote device 106 into commands that are appropriate for the sensor subsystem 102. For example, the remote device 106 may provide commands in a common interface with commands formatted similarly regardless of which type of scanning is requested. On the other hand, the sensor subsystem 102 may require commands in a different format for each type of scanning being performed. Thus, in some implementations, the interface subsystem 104 translates the commands from the remote device 106 into a format used at the sensor subsystem 102.

The sensor device 101 receives the scanning commands and, at operation 504, performs the requested scans. Performing the requested scans involves causing the various sensors involved in the request to perform the requested scans. For scanning communications protocols, the scanning involves activating the appropriate hardware and/or software module (e.g., software radio adapter 304, wireless NIC 306, Bluetooth adapter 308, radio 314) to scan the surroundings and detect communications via the respective communications protocol. For scanning ambient features of the environment, the scanning involves activating an appropriate sensor to scan the requested features. The scanning includes obtaining data as requested by the scanning commands.

In operation 506, the sensor device 101 processes the sensed data. In various implementations, the processing includes deriving qualitative information about the sensed communications. In some examples, the qualitative information includes information describing the source and destination of the communications. In some examples, the processing includes performing packet sniffing to obtain specific information from the detected communications. In some examples, the manner in which the packet sniffing occurs is specified in the scanning commands 502. In other words, in some examples, the remote device 106 specifies which information to extract from sensed packets. In some examples, one or more trained machine learning models executing within the sensor device 101 process the scanned data in any technically feasible manner. In some examples, the trained machine learning model is trained to identify a sensor or receiver of a communication based on the content of the communication. The trained machine learning models may be configured or trained to perform any other technically feasible processing of the sensed data. The processing of the scanned data may include any alternative or additional processing on the data. At operation 508, the sensor device 101 returns processed and/or raw data obtained with the sensor device 101 and processed in operation 506. The data is returned to the remote device 106.

In some implementations, the sensor device 101 and/or the remote device 106 monitors the robust communications channel 108 to maintain communications strength even where disruption occurs to some portions of the robust communications channel 108. More specifically, as described elsewhere herein, the robust communications channel 108 includes a plurality of communications paths 110. In the event that one or more of these communications paths 110 is used to transmit data and/or commands and are disrupted and thus provide insufficient bandwidth, the remote device 106 and sensor device 101 change which communications paths 110 to transmit the data. In some implementations, this changing occurs manually, by a user operating the remote device 106. In other examples, this changing occurs automatically, by software executing on the sensor device 101 and/or remote device 106.

In some implementations, the remote device 106 is able to update the software of the sensor device 101 using the robust communication channel 108. In various examples, these updates include updates to the machine learning models, to the software that processes the scanned data, to the software that controls the scanning, to the software that controls the software radio 130, or updates to any other software.

Although the remote device 106 is described as remote, the remote device 106 is, in some implementations, coupled to the sensor device 101 via a local connection (such as a wired connection or a short range wireless connection such as Bluetooth or Wi-Fi).

The elements in the figures are embodied as, where appropriate, software executing on a processor, a fixed-function processor, a programmable processor, or a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A sensor device comprising:
    a plurality of sensors; and
    a processor configured to:
        control the plurality of sensors to obtain sensed data, according to a plurality of commands received from a remote device over a robust communications channel that includes a plurality of communications paths, wherein the plurality of commands includes a first command to sense in a first scanning mode that scans physical characteristics of an environment and a second command to sense in a second scanning mode that scans for a communications protocol;
        select a communications path of the robust communications channel to use in response to a detection of a reduction in signal quality across one or more of the plurality of communications paths; and
        return the sensed data and reporting data over the selected communications path robust communications channel to the remote device, wherein the reporting data includes processed raw data for the first command and processed raw data for the second command.

2. The sensor device of claim 1, wherein the processor is further configured to:
    control the robust communications channel to change which communications paths are used to transmit the data and receive the commands.

3. The sensor device of claim 1, wherein the plurality of sensors includes one or more hardware devices configured to scan data transmitted according to a communications protocol.

4. The sensor device of claim 3, wherein the communications protocol includes one of a wireless computer network protocol, a Bluetooth protocol, or a software radio.

5. The sensor device of claim 1, wherein the plurality of sensors includes one or more hardware devices configured to sense one or more of electrical, optical, or magnetic features, or to sense time or location of the sensor device.

6. The sensor device of claim 1, wherein the processor is further configured to process the sensed data to obtain derived features of electronic communications.

7. The sensor device of claim 6, wherein the processing includes identifying one or more devices involved in the electronic communications.

8. The sensor device of claim 6, wherein the derived features are obtained via one or more machine learning models.

9. The sensor device of claim 6, wherein the processing includes performing packet sniffing.

10. A sensor system, comprising:
    a sensor device including a plurality of sensors; and
    a remote device,
    wherein the sensor device is configured to:
        control the plurality of sensors to obtain sensed data, according to a plurality of commands received from the remote device over a robust communications channel that includes a plurality of communications paths;
        select a communications path of the robust communications channel to use in response to a detection of a reduction in signal quality across one or more of the plurality of communications paths, wherein the plurality of commands includes a first command to sense in a first scanning mode that scans physical characteristics of an environment and a second command to sense in a second scanning mode that scans for a communications protocol; and
        return the sensed data and reporting data over the selected communications path of the robust communications channel to the remote device, wherein the reporting data includes processed raw data for the first command and processed raw data for the second command.

11. The sensor system of claim 10, wherein the sensor device is further configured to:
    control the robust communications channel to change which communications paths are used to transmit the data and receive the commands.

12. The sensor system of claim 10, wherein the plurality of sensors includes one or more hardware devices configured to scan data transmitted according to a communications protocol.

13. The sensor system of claim 12, wherein the communications protocol includes one of a wireless computer network protocol, a Bluetooth protocol, or a software radio.

14. The sensor system of claim 10, wherein the plurality of sensors includes one or more hardware devices configured to sense one or more of electrical, optical, or magnetic features, or to sense time or location of the sensor system.

15. The sensor system of claim 10, wherein the sensor device is further configured to process the sensed data to obtain derived features of electronic communications.

16. The sensor system of claim 15, wherein the processing includes identifying one or more devices involved in the electronic communications.

17. The sensor system of claim 15, wherein the derived features are obtained via one or more machine learning models.

18. The sensor system of claim 15, wherein the processing includes performing packet sniffing.

19. A method, comprising:
controlling a plurality of sensors to obtain sensed data, according to a plurality of commands received from a remote device over a robust communications channel that includes a plurality of communications paths, wherein the plurality of commands includes a first command to sense in a first scanning mode that scans physical characteristics of an environment and a second command to sense in a second scanning mode that scans for a communications protocol;
selecting a communications path of the robust communications channel to use in response to a detection of a reduction in signal quality across one or more of the plurality of communications paths; and
returning the sensed data and reporting data over the selected communications path of the robust communications channel to the remote device, wherein the reporting data includes processed raw data for the first command and processed raw data for the second command.

20. The method of claim 19, further comprising:
controlling the robust communications channel to change which communications paths are used to transmit the data and receive the commands.

* * * * *